United States Patent [19]

Morinaga

[11] Patent Number: 4,509,157
[45] Date of Patent: Apr. 2, 1985

[54] DISC PLAYER APPARATUS WITH AN IMPROVED DISC CLAMPER

[75] Inventor: Kaoru Morinaga, Yokohama, Japan

[73] Assignee: Tokyo Shibaura Denki Kabushiki Kaisha, Kawasaki, Japan

[21] Appl. No.: 398,926

[22] Filed: Jul. 16, 1982

[30] Foreign Application Priority Data

Jul. 20, 1981 [JP] Japan .................. 56-113254

[51] Int. Cl.³ .................. G11B 17/04; G11B 3/62
[52] U.S. Cl. .................. 369/75.2; 369/270
[58] Field of Search .................. 369/75.1, 75.2, 230, 369/270, 273

[56] References Cited

U.S. PATENT DOCUMENTS

| 3,156,472 | 11/1964 | Brock . | |
|---|---|---|---|
| 3,193,295 | 7/1965 | Isemura | 369/273 |
| 3,768,815 | 10/1973 | Mathurin . | |
| 3,891,796 | 6/1975 | Takahara et al. . | |
| 3,972,535 | 8/1976 | Bleiman | 369/270 |
| 4,053,161 | 10/1977 | Bleazey | 369/230 |
| 4,068,851 | 1/1978 | Yamaura . | |
| 4,194,743 | 3/1980 | Ohsawa et al. . | |
| 4,232,870 | 11/1980 | Iemenschot | 369/270 |
| 4,306,259 | 12/1981 | Saito et al. . | |

FOREIGN PATENT DOCUMENTS

| 2090099 | 9/1980 | Fed. Rep. of Germany . | |
|---|---|---|---|
| 2252625 | 6/1975 | France . | |
| 2304136 | 10/1976 | France . | |
| 149011 | 12/1978 | Japan | 369/270 |
| 55-93871 | 6/1980 | Japan . | |
| 55-165473 | 11/1980 | Japan . | |
| 55-153662 | 11/1980 | Japan . | |

Primary Examiner—Steven L. Stephan
Attorney, Agent, or Firm—Finnegan, Henderson, Farabow, Garrett & Dunner

[57] ABSTRACT

A disc clamper includes a clamp member for holding a disc against a turntable and a support member for supporting the clamp member. The clamp member is provided with a permanent magnet, and the support member has a winding. The winding is coaxially arranged to the magnet. When a certain DC current is applied to the winding, the clamp member is subjected to an electromagnetic repelling force effected between the winding and the magnet. Then, the disc is fixed to the turntable by means of the electromagnetic repelling force, and the clamp member is mechanically free from the support member.

31 Claims, 15 Drawing Figures

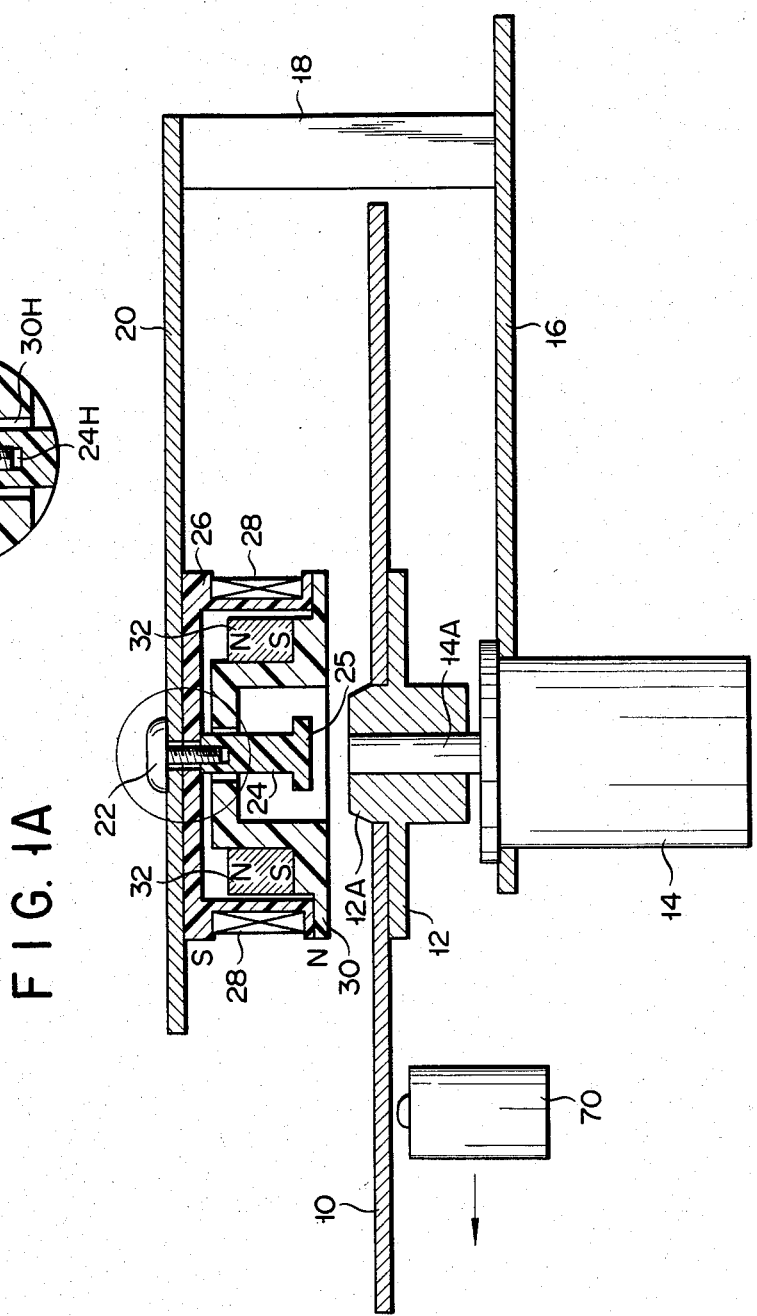

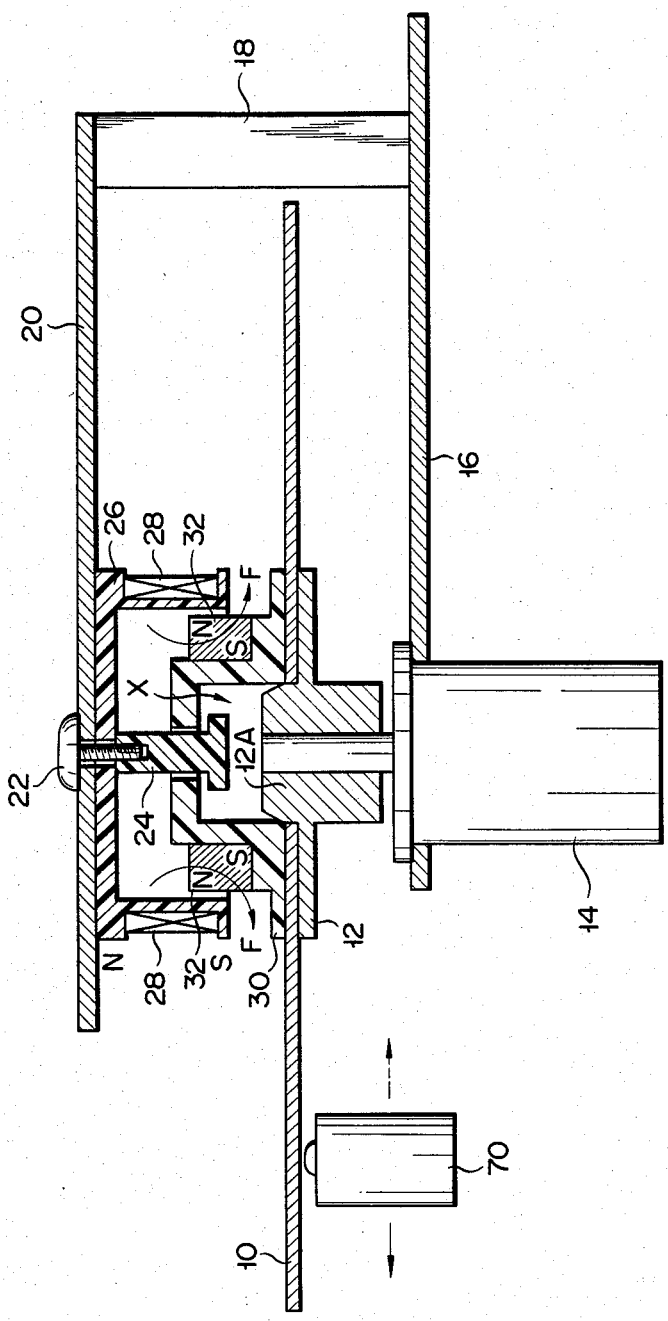

4,509,157

DISC PLAYER APPARATUS WITH AN IMPROVED DISC CLAMPER

BACKGROUND OF THE INVENTION

This invention relates to a disc player apparatus being provided with a disc clamper, particularly to improvement of a disc clamper for a digital disc player in which a disc is rotated with a relatively high speed.

Recently, an attempt is being made to put a digital disc player apparatus to a practical use for the purpose of a high fidelity and high density recording/playback operation of information. In a digital disc system, information such as an audio signal in PCM (Pulse Code Modulation) type digital form or a video signal is directly recorded on a disc. In such system, at the time of playback operation, digital signals recorded are picked up from the disc and thereafter they are demodulated. Here, there are some schemes of the recording/playback method for digital disc player apparatus. An optical recording/playback system or an electrostatic recording/playback system is a typical known scheme of the digital disc player. In these systems a constant line velocity (CLV) drive method is often used for recording and playing back digital information. In the CLV method, a pickup is linearly shifted with a constant speed along the radial direction of disk, and the rotational speed of disc is continuously varied with the shift of pickup so that the relative speed of the pickup in relation to a signal track of the disk is constant.

In a digital disc system, since a wide frequency range recording/playback operation is required, the rotation speed of a turntable for driving a disc is very high (e.g., 200 to 500 rpm.). During a period of time from the start (0 rpm.) to a given high speed rotation (500 rpm.), therefore, the disc is subjected to a large acceleration. Accordingly, if the disc is not steadily fixed to the turntable, the disc will slip over the turntable. Such slip will also be caused by the rotational speed change of the turntable during operation of the player.

To avoid the above slip, there is provided with a disc clamper for fixing a disc to the turntable. Namely, the digital disc player apparatus has a disk table driven by the rotational force of a motor and a clamper being supported by a certain support member. The disc is sandwiched between the disc table and the clamper and is steadily fixed to the turntable by the pressure effected therebetween. From this, it is required that the clamper is so supported that it can smoothly rotate with the rotation of the disc and that it can stably press the disc with a certain force. However, realization of the above requirement as to the supporting structure of said clamper and support member involves practical difficulties because of their complexity. Further, since such supporting structure is liable to impose fitful friction upon the turn table, it will cause to retard smooth rotation of the disk and unfavorably affect the quality of played back signals.

SUMMARY OF THE INVENTION

It is accordingly the object of the present invention to provide an improved clamper for a disc player.

Another object of the invention is to provide a disc player apparatus with an improved disc clamper.

According to this invention, in an actual operation mode, a clamper holds a disc against a turntable by means of electromagnetic repelling force. A clamping mechanism of the invention is as follows.

First, a disc is put on a turntable. In this case a disc clamper is so supported by a support member that the clamper is lifted over the disc. The clamper is equipped with a magnet, and the support member is furnished with an electromagnet facing to the magnet of clamper. When, for instance, a playback operation is commenced, the electromagnet is excited by substantial magnitude of a current applied thereto. Then, the magnetic field generated by the electromagnet pushes or presses the magnet so that the clamper holds the disc against the turntable by means of electromagnetic repelling power.

Second, a motor coupled to the turntable starts to rotate, and the disc steadily fixed to the turntable is rotated with a given high speed without slipping.

Typical advantages of the invention are as follows.

First, the disc is held against the turntable by a magnetic repelling force.

When a magnetic attractive force is utilized for the clamping, since the magnitude of such attractive force is rapidly increased as the clamper comes close to the disc, the clamper will strongly impact upon the disk, thereby the disc, and further, an accurately manufactured shaft bearing of the motor will be damaged by numerous repetitions of such impact during a long period of use.

On the contrary, since a clamper of the invention is always subjected to a magnetic repelling force, the clamper does not bring with said impact.

Second, the clamper is mechanically free from the support member in an actual operation mode, e.g., in a playback mode.

A conventional approach has utilized a mechanical resilient force for clamping the disc. In such method, however, the clamper must mechanically be touched with its support member. Accordingly, the motor will unavoidably suffer from fitful mechanical friction and a precise uniform rotation of the disc will hard to obtain.

On the contrary, since the magnetic repelling force can be effected without a mechanical contact of the clamper and its support, the clamper of the invention is mechanically free from the support member to avoid unfavorable influence of said fitful mechanical friction.

BRIEF DESCRIPTION OF THE DRAWINGS

FIG. 1A is a partial sectional view of a disc player having a clamper of the invention wherein the clamper is in a standby state;

FIG. 1B is a sectional view of the disc player as shown in FIG. 1A wherein the clamper (30) holds the disc (10) against the turntable (12);

FIG. 1C is an enlarged sectional view of the circled portion of FIG. 1A;

DETAILED DESCRIPTION OF THE PREFERRED EMBODIMENTS

Figure 2:
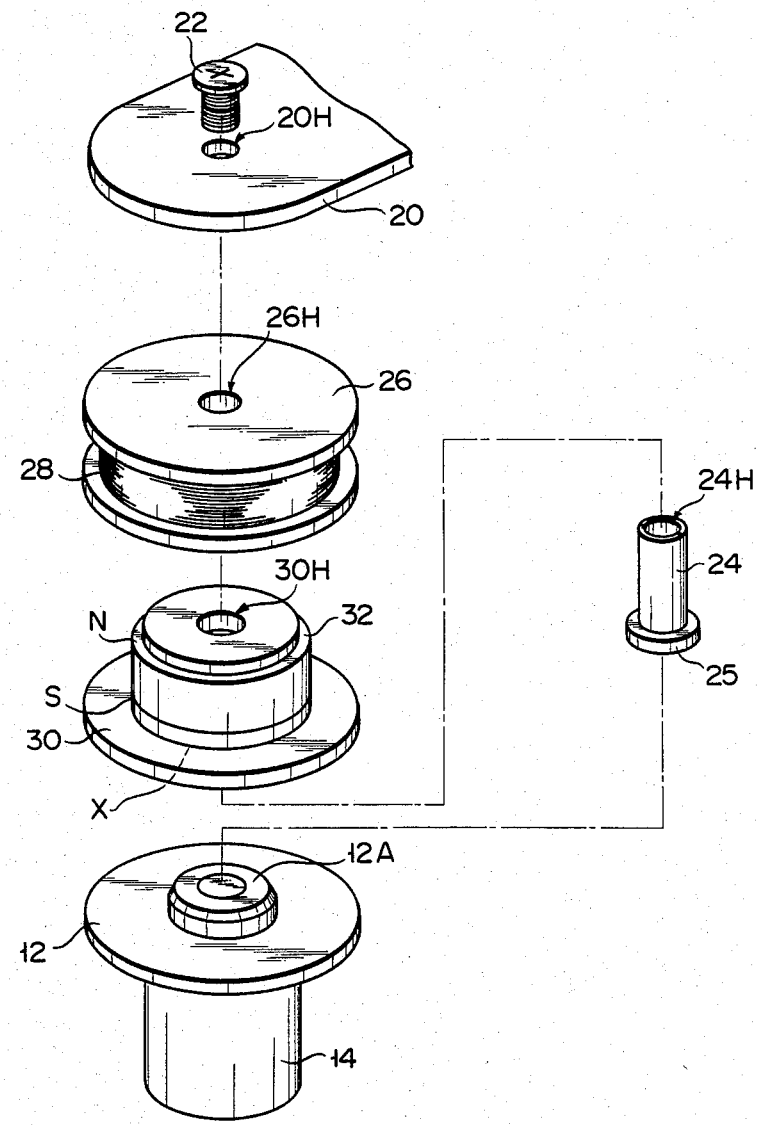
FIG. 2 shows a perspective view of an essential portion of the clamper (30) according to the invention.

Before proceeding with the description of the invention, it is noted that like reference symbols are used to designate like portions throughout the drawings for brevity's sake.

Now, description will be given to the case where a clamper of the invention is used for a digital audio disc player apparatus utilizing, e.g., an optical recording/playback system.

FIG. 1A shows one embodiment of the disc player wherein a disc 10 is put on a brim portion of a turntable 12 so that a center spindle 12A of turntable 12 penetrates a center hole of disc 10. Disk 10 used here has a reflection film of aluminum covered by a protection lacquer coating and has a diameter of, e.g., $\phi$120 mm. A plane of disc 10 facing to turntable 12 side is provided with pit trains corresponding to a PCM digital audio signal, and they are detected by a laser pickup 70 which is located just under disc 10 and is linearly shifted from the inner side of disc 10 to the outer side thereof during the playback operation. This is so-called "pickup under disc" structure. The rotational speed of turn table 12 is, e.g., 500 rpm. when pickup 70 is located at the innermost side of disc 10, and it is 200 rpm. where pickup 70 is located at the outermost side of disc 10, for example. Turntable 12 is coaxially fixed to a rotor shaft 14A of a motor 14. Motor 14 is mounted on a given portion of a chassis 16. A prop 18 is mounted on a certain place of chassis 16 so that the edge of disk 10 does not touch to prop 18. Prop 18 supports a subchassis 20. Subchassis 20 has an opening 20H just above the rotational center position of turntable 12. Penetrated through opening 20H is a screw 22. Screw 22 is screwed or tapped into a screw hole 24H of a guide rod 24 via the opening 20H and an opening 26H of a reel 26. Rod 24 penetrates a hole 30H of a clamp member 30. Thus, reel 26 is sandwiched between subchassis 20 and rod 24, and reel 26 is fixed to subchassis 20 by the tightening force of screw 22.

The reel 26 is provided with a winding 28 which forms an electromagnet when a certain DC current is applied thereto. The clamp member 30 is surrounded by winding 28. A ring like permanent magnet 32 is mounted on member 30 so that the geometrical center of a circle being defined by the figure of winding 28 is coaxially aligned to that of ring magnet 32. The diameter of hole 30H of member 30 is slightly larger than that of rod 24 penetrating the hole 30H. For instance, the diameter of rod 24 is $\phi$4 mm and the diameter of hole 30H is $\phi$5 mm. Therefore, member 30 is permitted to smoothly move along the rod 24 within a certain range. Rod 24 has a flange 25 whose diameter is larger than that of hole 30H. Flange 25 prevents that member 30 slips out of rod 24.

FIG. 1A shows a playback standby state wherein the clamp member 30 is lifted over the turntable 12 by an electromagnetic attractive force effected between the magnet 32 and the electromagnet of winding 28 to which a given DC current is applied.

FIG. 1B shows a playback operation state wherein clamp member 30 holds disc 10 against turntable 12. Member 30 has a hat like configuration and possesses a cavity or hollow X. The diameter of hollow X is so selected that hollow X sommothly fits the spindle 12A without substantial play. For instance, hollow X has $\phi$15.3 mm diameter and spindle 12A has $\phi$15.0 mm diameter. In this case, an alignment discrepancy between the geometrical center axis of hole 30H and the rotational center axis of turntable 12 will be 0.3 mm at most. Here, if the diameters of rod 24 and hole 30H are $\phi$4 mm and $\phi$5 mm, respectively, the inner wall of hole 30H does not touch to rod 24 when member 30 clamps disc 10. Of course, at this time, flange 25 and member 30 are apart. Thus, clamp member 30 is mechanically free from rod 24.

In the clamping state, a magnetic field generated around winding 28 repels magnet 32 by electromagnetic force F effected between winding 28 and magnet 32, and this force F clamps disc 10 on turntable 12. When the flowing direction of DC current applied to winding 28 is inverted, winding 28 generates a magnetic field which attracts magnet 32, and member 30 is lifted over the disk 10 as shown in FIG. 1A.

FIG. 2 illustrates how to assemble the components 20 to 32. An electric wire 28 is wound around reel 26 to form an electromagnet assembly (26+28). Reel 26 may be either ferromagnetic or nonmagnetic material. Sliced pineapple like ferrite magnet 32 is adhered to the projection of hat like member 30. The magnetization of magnet 32 is along its thickness direction of the slicing. Member 30 is made of a nonmagnetic material such as plastic. Screw hole 24H side of guide rod 24 is inserted into the hollow X of member 30, and rod 24 penetrates the hole 30H. Then, the cavity portion of electromagnet assembly (26+28) is put on the projected portion of member 30 so that rod 24 stuck out of hole 30H is further inserted into the hole 26H of reel 26. Finally, screw 22 is screwed via the hole 20H of subchassis 20 into screw hole 24H which is positioned at the hole 26H. By the tightening of screw 22, the center axis of rod 24 is aligned to the rotational center axis of turntable 12.

Incidentally, magnet 32 may have a figure other than a sliced pineapple like one. For instance, two or more equiangularly arranged magnet pieces may be used for ring magnet 32. Further, winding 28 may have a figure other than a circle. For instance, reel 26 may be a rectangular frame for winding 28.

Figure 3A:
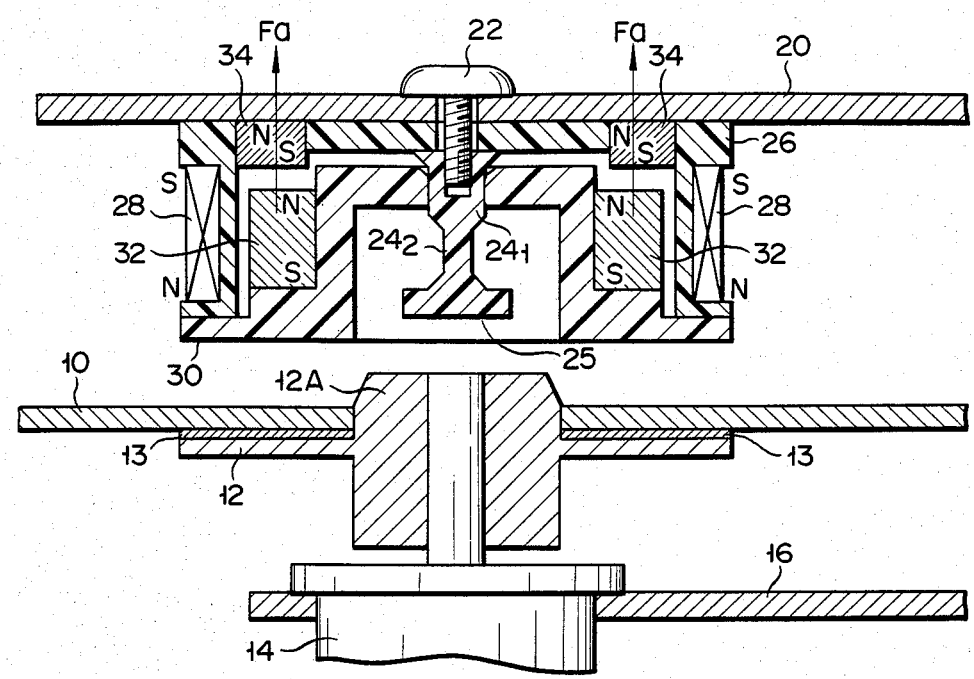
FIG. 3A is a sectional view showing another embodiment of the clamper of this invention wherein the disc (10) is not clamped.
Figure 3B:
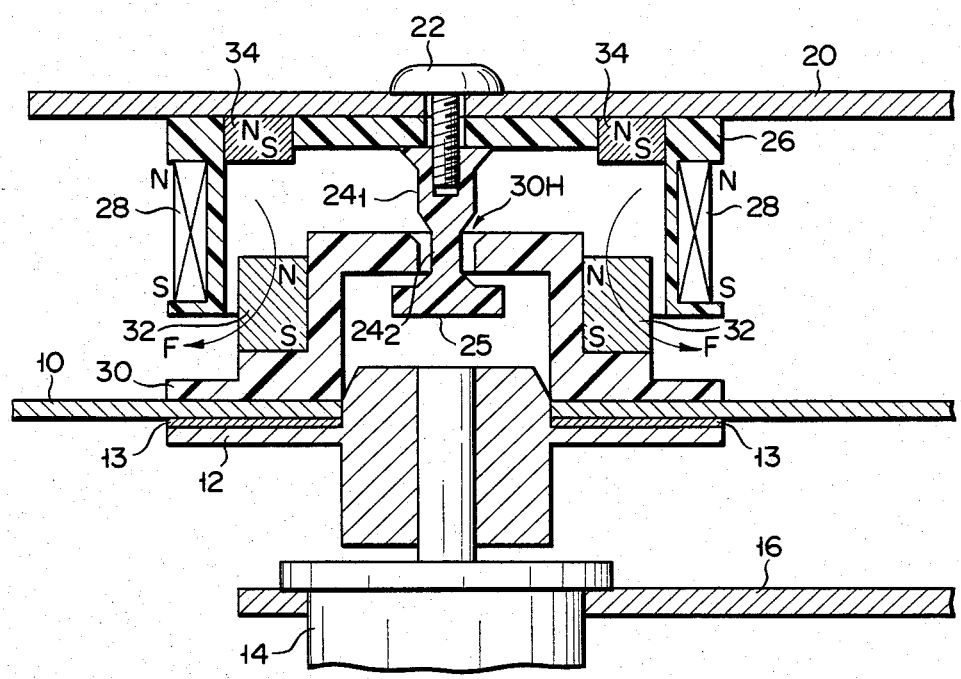
FIG. 3B is a sectional view of the clamper as shown in FIG. 3A wherein the clamper (30) holds the disc (10) against the turntable (12)

FIGS. 3A and 3B show another embodiment of the invention. In this embodiment, the brim portion of turntable 12 is provided with a flat plained rubber sheet 13. Any other material having large coefficient of static friction may be used for rubber sheet 13. Further, reel 26 is provided with a ring magnet or equianglarly arranged magnets 34 facing to the magnet 32. As shown in FIG. 3A, magnet 34 is used for attracting magnet 32 by magnetic force Fa so that clamp member 30 is held at reel 26 in, e.g., a playback standby state, even though no DC current is applied to winding 28. Still further, guide rod 24 has a first portion $24_1$ and a second portion $24_2$ whose diameter is smaller than the diameter of first portion $24_1$. Where the diameter of hole 30H of member 30 is $\phi 5.0$ mm, then the diameter of first and second portions $24_1$ and $24_2$ are, e.g., $\phi 4.8$ mm and $\phi 2.5$ mm, respectively. When member 30 is held at reel 26, hole 30H is just fitted to the first portion $24_1$. In this case, the center axis of member 30 is exactly aligned to the rotational center axis of turntable 12 with mechanical play of 0.2 mm at most (FIG. 3A).

Where disc 10 is to be clamped in a playback operation mode, winding 28 is supplied with a given DC current so that a magnetic field generated by the excited winding 28 breaks the magnetic attraction force Fa effected between magnets 32 and 34. Then, member 30 is pushed toward turntable 12 side, and disc 10 placed on sheet 13 is pressed by a magnetic repelling force F as shown in FIG. 3B. In this case, the hole 30H is completely separated from the second portion $24_2$.

Figure 4A:
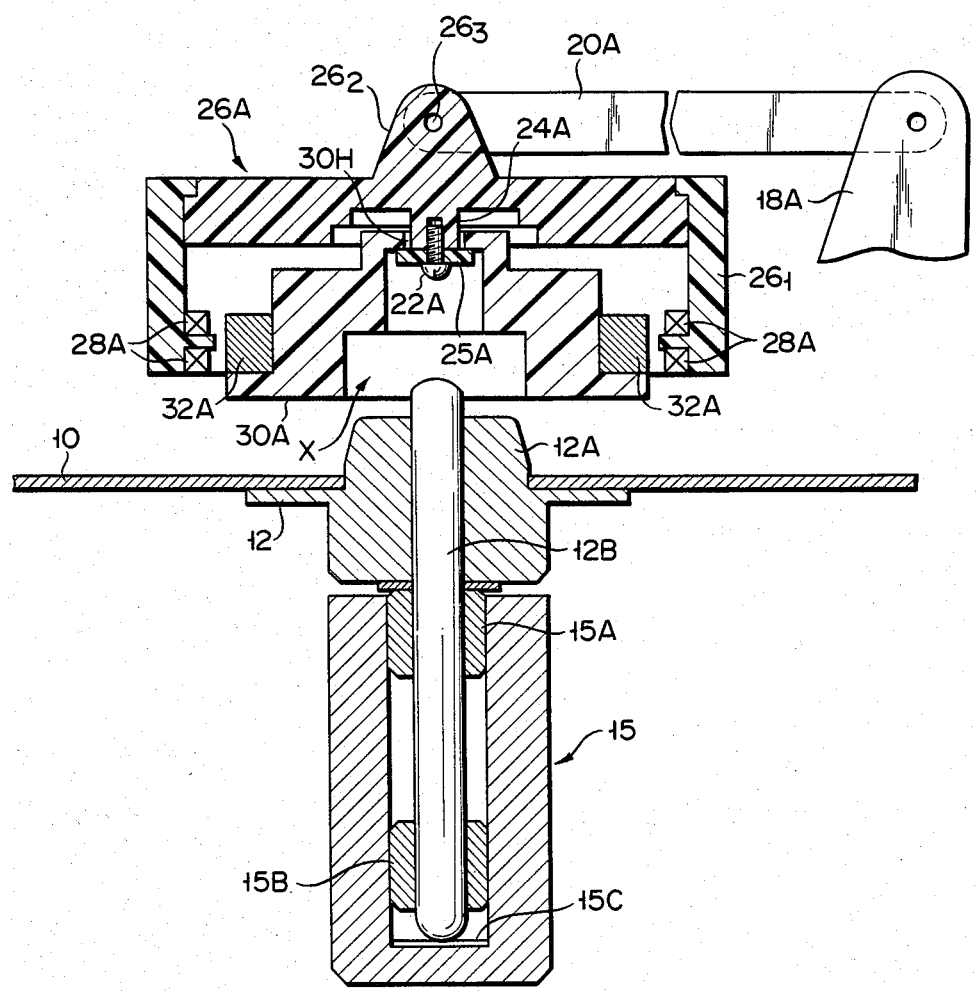
FIGS. 4A, 4B and 4C show another embodiment of the clamper of the invention wherein the clamper (30A) functions as a motor.
Figure 4B:
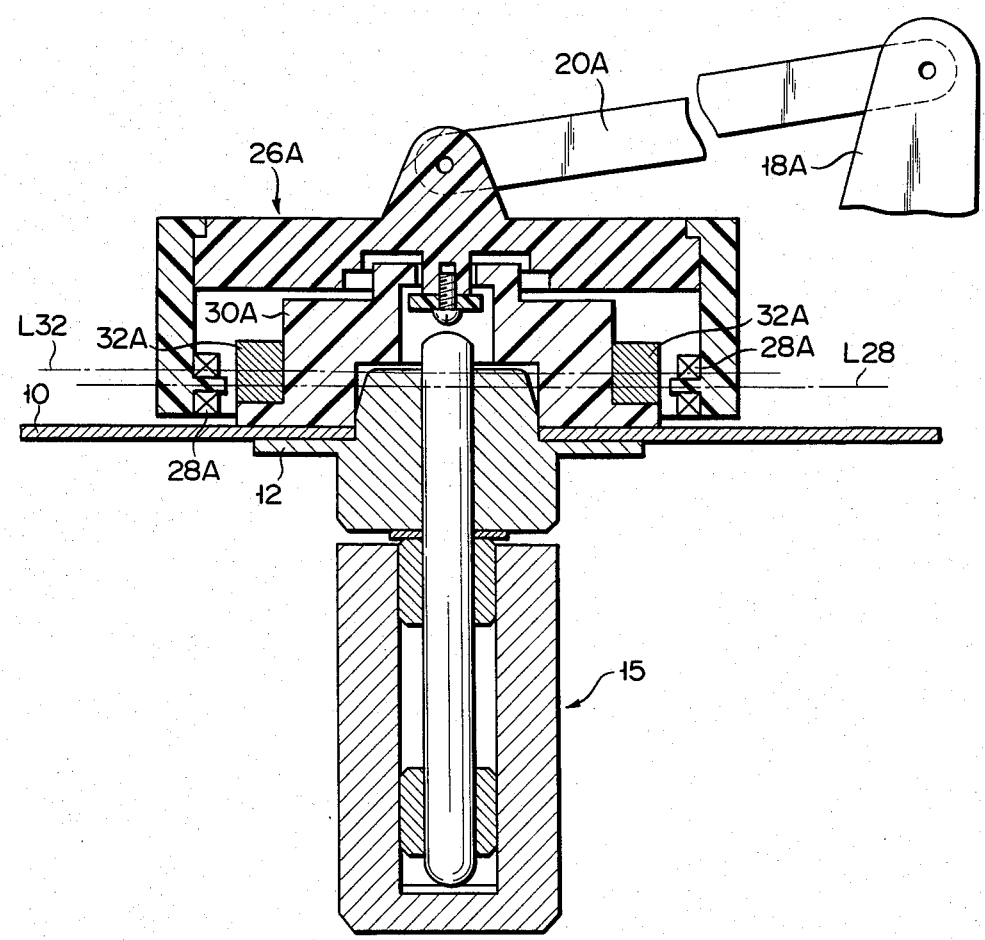
Figure 4C:
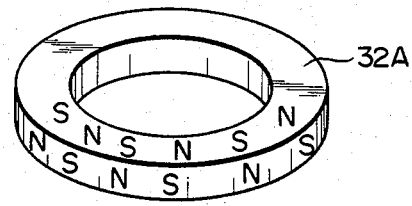

FIGS. 4A, 4B and 4C show another embodiment of the invention. In this embodiment an electromagnet assembly ($26_1$+28A) and a clamp member 30A with a magnet 32A jointly constitute a brush-less motor for rotating the disc 10. Details as to such motor and its driving electric circuitry are disclosed in Japanese patent application Nos. 56-113248 and 56-113250. All disclosures of these applications are now combined herewith.

Turntable 12 is fixed to the upper side of a turntable shaft 12B (FIG. 4A). The lower side of shaft 12B is inserted into a bearing assembly 15 in which shaft 12B is partly received by pillows 15A and 15B and the lower end of shaft 12B is supported by a bearing board 15C. By such bearing assembly turntable 12 can smoothly rotate. The assembly 15 is mounted on a chassis (not shown).

A support member 26A has a side wall $26_1$. Mounted on the inside of wall $26_1$ are equiangularly arranged plural field coils 28A (e.g., 8 coils). Clamp member 30A is provided with ring magnet 32A. Magnet 32A is magnetized along with its radial direction and is alternatively magnetized as shown in FIG. 4C. Inserted into a hole 30H of member 30A is a guide post 24A being formed on an inner center position of member 26A. After this insertion a stopping flange 25A is fixed to the end of post 24A by a screw 22A. Member 26A has a boss $26_2$ at the center place of its outer top end plane. Boss $26_2$ has a screw hole $26_3$ which is used for rotatively connecting the member 26A with one end of a lift arm 20A by means of a screw shaft (not shown). The other end of arm 20A is rotatively connected to a boss 18A. Boss 18A is mounted on a certain place of a cabinet member (not shown) coupled to the chassis on which said bearing assembly 15 is mounted.

Where disc 10 is to be held against turntable 12, arm 20A so inclines that member 30A lands on disc 10 (FIG. 4B). Then, each of field coils 28A is sequentially excited in order to generate a rotational magnetic field around magnet 32A. This magnetic field applies to magnet 32A a rotational force as well as a holding or clamping force. The clamping force is obtained from two facts. One is the weight of clamp member assembly (30A+32A), and the other is the centripetal force effected between coils 28A and magnet 32A. When the magnetic center plane L32 of ring magnet 32A is slightly separated from that L28 of the arrangement of coils 28A as shown in FIG. 4B, said centripetal force is effected so that member 30A pushes disc 10 toward turntable 12 side. Thus, the device of FIGS. 4A to 4C functions as a motor as well as an electromagnetic clamper.

Incidentally, when the coils 28 have a configuration for a AC motor, the magnet 32A may be replaced by a shorted coil assembly to form an AC induction motor.

Figure 5:
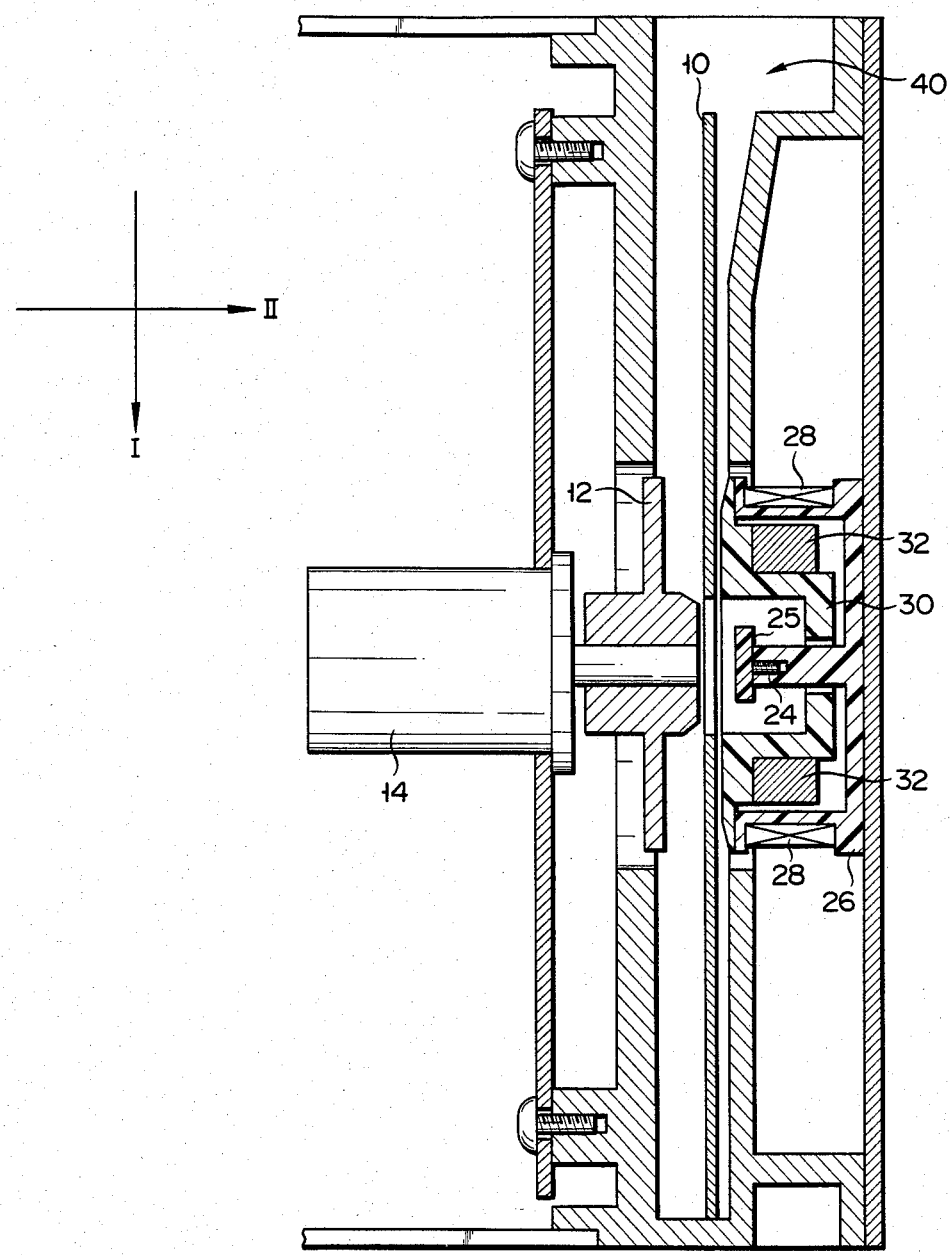
FIG. 5 shows another embodiment of the clamper of the invention wherein the turntable is vertically arranged.

FIG. 5 shows another embodiment of the invention. Here, when the gravity is effected along the direction I, the configuration of FIG. 5 is a vertical type disc player. In this case disc 10 is inserted from an upper inlet 40. After the insertion, disc 10 is pushed from winding 28 side by means of clamper 30 and is held against turntable 12. When the gravity is effected along the direction II, FIG. 5 configuration is a horizontal type disc player. In this case, disc 10 is lifted to upward direction by clamper 30 and then it is held at turntable 12.

Figure 6A:
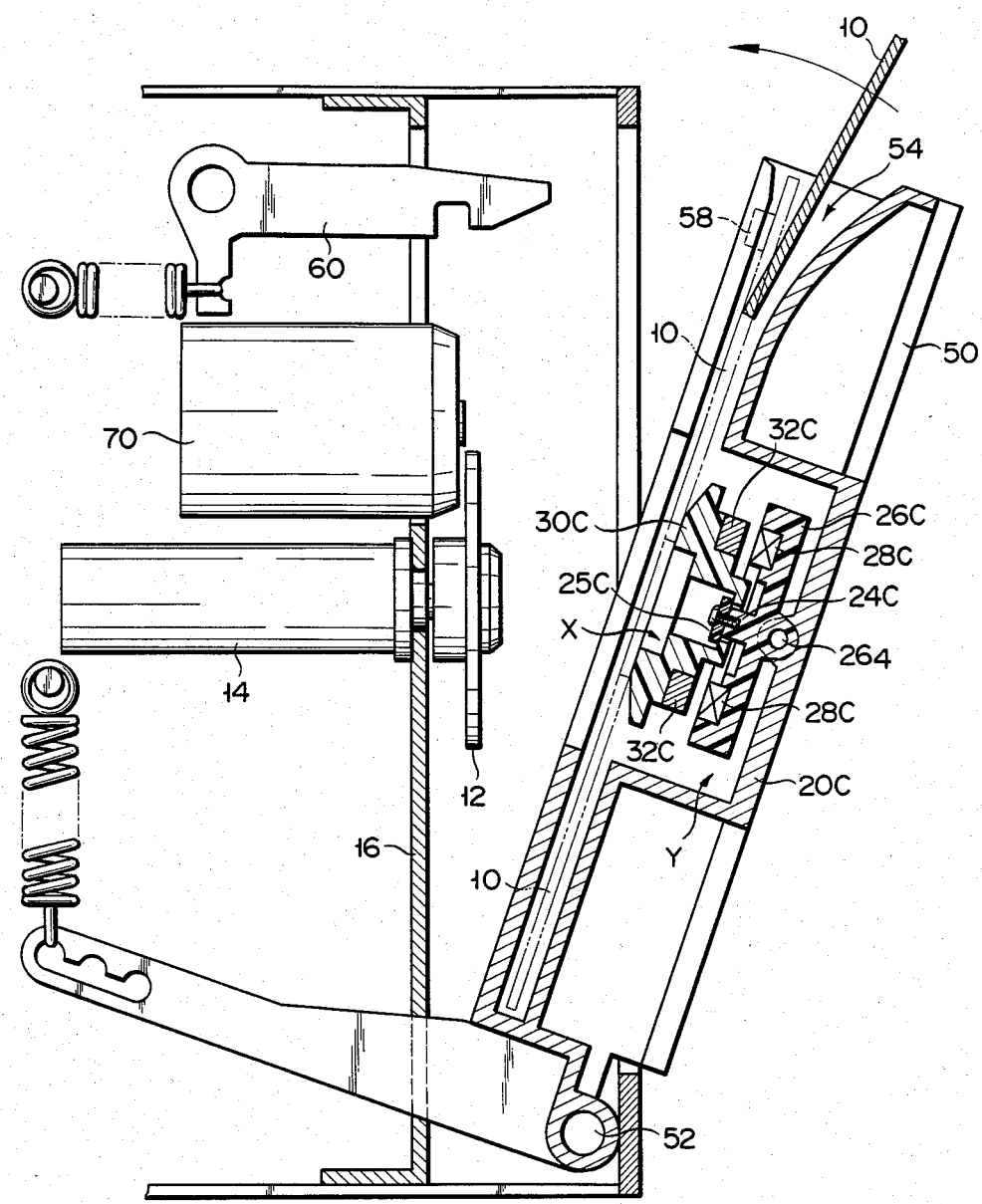
FIGS. 6A and 6B show another embodiment of the clamper according to the invention wherein the turntable is vertically arranged and the clamper is mounted in a flap member having a kangaroo pocket.
Figure 6B:
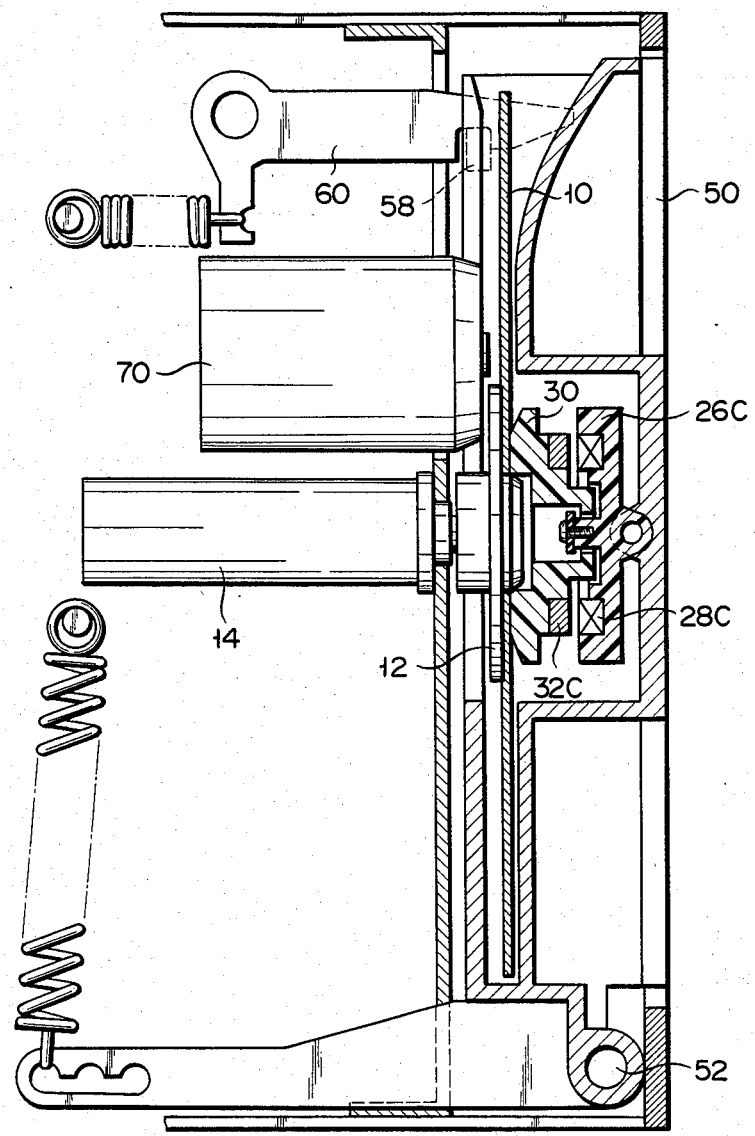

FIGS. 6A and 6B show another embodiment of the invention. In this embodiment, turntable 12 is vertically arranged, and clamper 30C is mounted within a flap 50 having a kangaroo pocket to which disc 10 is inserted. Flap 50 is rotatively supported at a pivot portion 52. The substantial center portion of flap 50 is provided with a cavity Y being defined by a cavity wall 20C. In cavity Y, a support member 26C is fixed to wall 20C at its projected portion $26_4$ by means of, e.g., a screw (not shown). Member 26C has a guide post 24C at its center position and also has one or more coils 28C arranged around post 24C. Post 24C supports clamper 30C with a certain mechanical play and a slip out of clamper 30C is prevented by a stopping flange 25C. Clamper 30C has a ring magnet 32C being faced to coils 28C. Coils 28C can generate a magnetic field which repels the magnet 32C.

Disc 10 is inserted from an inlet 54 of the kangaroo pocket. After the insertion the center hole of disk 10 substantially comes to just before the hollow X of clamper 30C (FIG. 6A). Next, flap 50 is pushed toward the inner side of the player until a locking lever 60 grasps a stuck portion 58 which is located at a given position of flap 50. The center hole of disc 10 is sandwiched between turntable 12 and clamper 30 (FIG. 6B). Then, coils 28C are power-supplied, and disc 10 is steadily held against turntable 12 by the electromagnetic repelling force which is so effected between coils 28C and magnet 32C that clamper 30 pushes disc 10. In this case, the data recorded plane of disc 10 is set in face of a laser pickup 70, motor 14 starts to rotate, and pickup 70 detects information from the rotated disc 10.

Incidentally, details as to a kangaroo pocket type digital disc player are disclosed in Japanese patent application No. 56-113249. All disclosures of this application are combined herewith.

Figure 7:
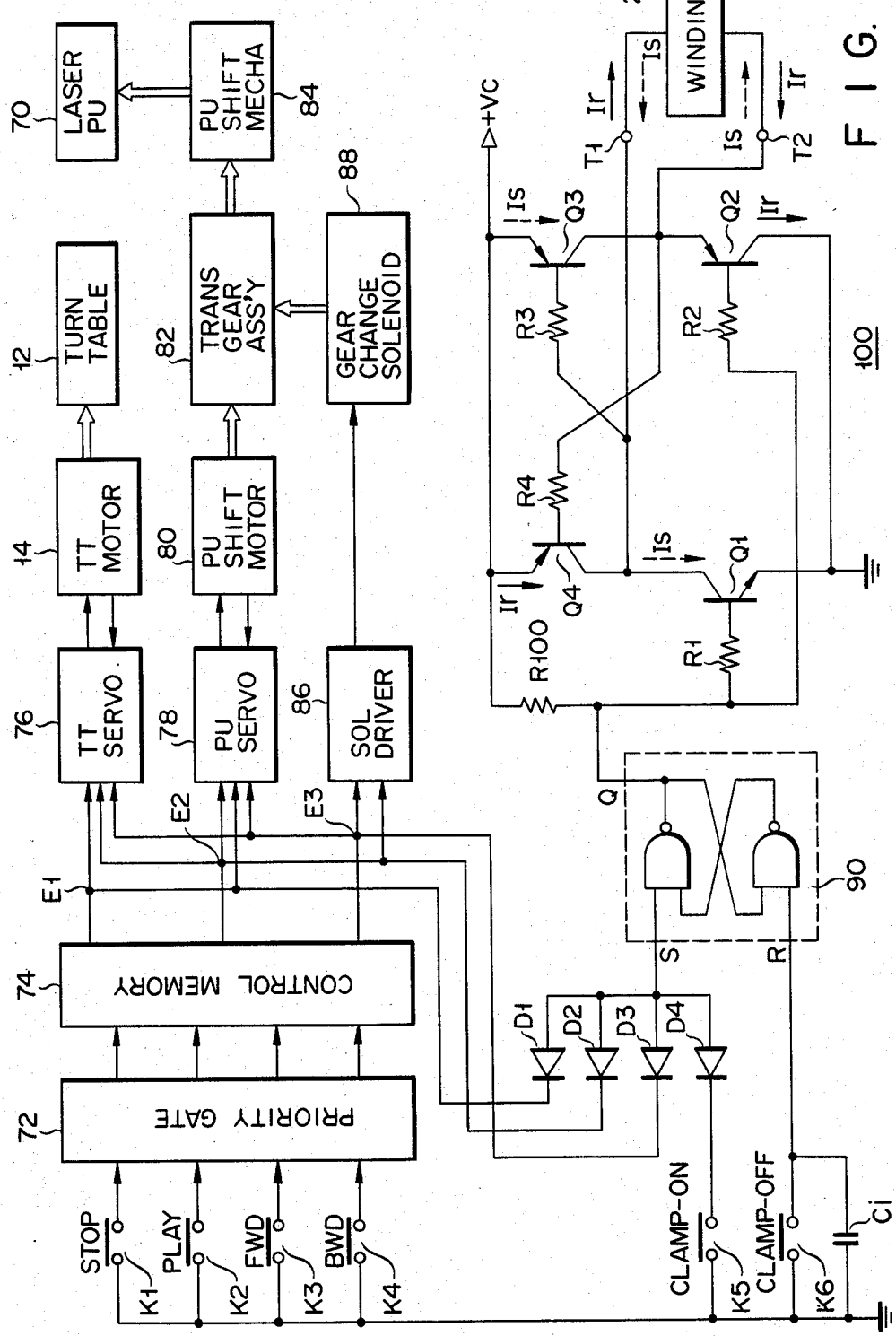
FIG. 7 shows an electric circuitry for controlling the clamping operation of the clamper (30) shown in FIGS. 1A and 1B.
Figure 8:
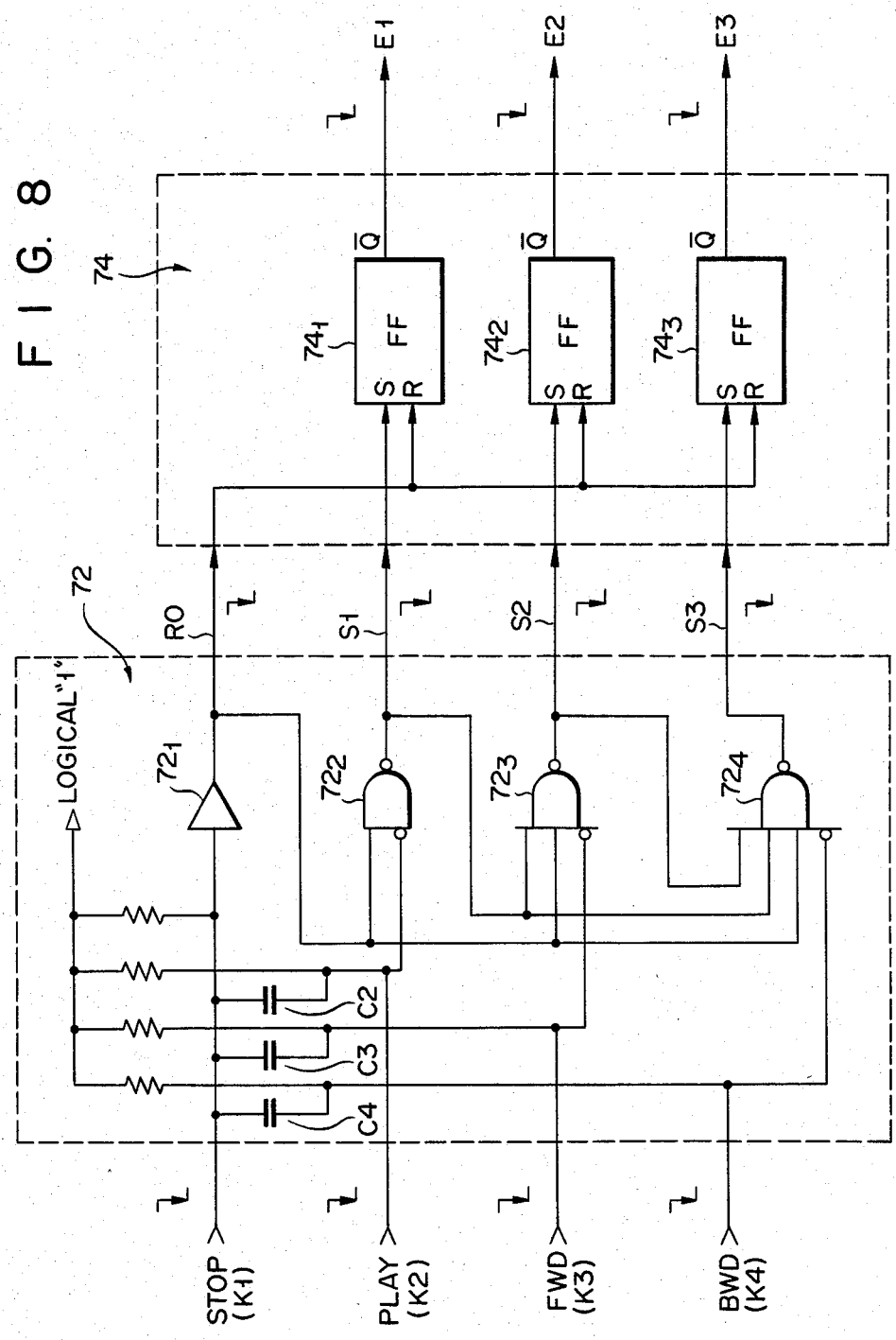
FIG. 8 shows detailed circuit configurations of the priority gate (72) and the control memory (74) shown in FIG. 7.

FIG. 7 shows an electric circuit for controlling the operation of clamper 30 of FIGS. 1A and 1B, and FIG. 8 shows details of a priority gate 72 and a control memory 74 of FIG. 7.

Operation keys K1 to K4 are coupled at their each one end to a control memory 74 via a priority gate 72. The other end of each of keys K1 to K4 are grounded. Gate 72 affords priority order to the instructions of keys K1 to K4. Where the priority order is so settled that K1 (stop)>K2 (playback)>K3 (forward search)>K4 (backward search), then the circuit configuration of gate 72 may be one as shown in FIG. 8.

In FIG. 8, when key K1 is depressed, the logical level of output R0 of an inverter $72_1$ becomes to "0". Then, all NAND gates $72_2$ to $72_4$ are closed by R0×"0", and all flip-flops (FF's) $74_1$ to $74_3$ are reset independent of keys K2 to K4. Thus, key K1 has a prime priority.

Keys K2, K3 and K4 are coupled to key K1 via capacitors C2, C3 and C4, respectively. When key K2 is depressed, the input of inverter $72_1$ temporarily and instantly becomes to logical "0" by means of the transient coupling of capacitor C2. In this case all FF's $74_1$ to $74_3$ are temporarily reset. After the release of such temporary reset, the logical level of output R0 is returned to "1". Similarly, the ON operation of each of keys K3 and K4 temporarily and instantly resets FF's $74_1$ to $74_3$. Where key K2 is still depressed under R0="1" (key K1 is not depressed), the logical level of an output S1 of gate $72_2$ becomes to "0". Then, gate $72_3$ and $72_4$ are both closed by S1="0", and only FF $74_1$ is set by S1="0" independent of keys K3 and K4, and thereby only a first output E1 of memory 74 becomes to "0".

When key K3 is depressed under R0=S1="1" (keys K1 and K2 are not depressed), the logical level of an output S2 of gate $72_3$ becomes to "0", and gate $72_4$ is closed by S2="0". Then, only FF $74_2$ is set independent of key K4 so that only a second output E2 of memory 74 becomes to "0".

When key K4 is depressed under R0=S1=S2="1" (keys K1 to K3 are not depressed), the logical level of an output S3 of gate $72_4$ is "0". Then, only FF $74_3$ is set to provide a third output E3 having logical "0".

In FIG. 7, outputs E1 to E3 are applied to a turn table servo circuit 76 and a pickup servo circuit 78. Circuit 76 is connected to the turn table motor 14 which is mechanically coupled to the turn table 12. Circuit 78 is connected to a pickup shift motor 80. Motor 80 is coupled via a transmission gear assembly 82 to a pickup shift mechanism 84. Connected to mechanism 84 is the laser pickup 70. Outputs E2 and E3 are applied to a solenoid driver 86. Driver 86 is connected to a gear change solenoid 88 being coupled to the gear assembly 82.

Outputs E1 to E3 are coupled to the cathodes of diodes D1 to D3, respectively. Each anode of diodes D1 to D3 is connected to the set input S of a negative-going triggered type RS flip-flop (FF) 90. Set input S of FF 90 is coupled via the anode-cathode path of diode D4 to one end of a key K5. The reset input R is coupled to one end of a key K6. The other end of each of keys K5 and K6 are grounded. Reset input R is also grounded via a capacitor Ci for initially resetting FF 90 at the time of POWER-ON of the disk player. That is, uncharged capacitor Ci functions as a means for initializing FF 90.

A Q outut of FF 90 is coupled via a resistor R100 to a power source +Vc whose electric energy is used for exciting the winding 28 of clamper 30. Q output is also coupled to the base of an NPN transistor Q1 via a resistor R1 and to the base of a PNP transistor Q2 via a resistor R2. The emitter of transistor Q1 and the collector of transistor Q2 are grounded. The collector of transistor Q1 is coupled to the base of a PNP transistor Q3 via a resistor R3 and is directly connected to the collector of a PNP transistor Q4. The emitter of transistor Q2 is coupled to the base of transistor Q4 via a resistor R4 and is directly connected to the collector of transistor Q3. Applied to the emitters of transistors Q3 and Q4 are power source +Vc. The collectors of transistors Q1 and Q4 are connected to a terminal T1, and the emitter and collector of transistors Q2 and Q3 are connected to a terminal T2. Connected to terminals T1 and T2 is the winding 28.

The circuit configuration of FIGS. 7 and 8 will operate as follows.

Where playback key K2 is depressed, the input of inverter $72_1$ temporarily becomes to logical "0" via a transient signal coupling of capacitor C1, and all FF's $74_1$ to $74_3$ are reset (FIG. 8). Then, only FF $74_1$ is set, and output E1 becomes to logical "0". The logical "0" of output E1 sets FF 90 so that transistors Q1 and Q3 are ON while transistors Q2 and Q4 are OFF (FIG. 7). In this case, a DC exciting current Is flows from terminal T2 via winding 28 to terminal T1, and winding 28 generates an electromagnetic repelling force so that the clamper 30 holds the disk 10 against the turn table 12 (FIG. 1B).

Output E1 having logical "0" renders TT servo circuit 76 active (FIG. 7). Thus, circuit 76 drives the motor 14 and controls the rotational speed of motor 14. Then the disc 10 being clamped by said electromagnetic repelling force starts to rotate. Output E1 of logical "0" also actuates PU servo circuit 78 so that PU shift motor 80 rotates to, e.g., clockwise direction. The rotation of motor 80 is transmitted via gear assembly 82 to PU shift mechanism 84. In this case, the gear ratio of assembly 82 is so set that mechanism 84 moves laser PU 70 with a given slow speed of, e.g., 50 μm/sec.

When forward search key K3 is depressed, FF's $74_1$ to $74_3$ are temporarily reset, and then FF $74_2$ is set so that output E2 becomes to logical "0" (FIG. 8). The logical "0" of output E2 sets FF 90 so that the clamper 30 clamps the disc 10 (FIG. 7). Output E2 of logical "0" also renders servo circuit 76 active, and it actuates servo circuit 78 so that motor 80 rotates to clockwise direction. Output E2 having logical "0" also actuates solenoid driver 86. Then, gear change solenoid 88 changes the gear ratio of assembly 82 so that mechanism 84 moves PU 70 from the inner side of disc 10 to the outer side thereof with a given high speed of, e.g., 6 mm/sec. or more.

When backward search key K4 is depressed, FF's $74_1$ to $74_3$ are temporarily reset, and FF $74_3$ is set. Then, output E3 of FF $74_3$ becomes to logical "0". The logical "0" of output E3 renders servo circuit 76 and solenoid driver 86 active. Output E3 of logical "0" also changes the operational condition of servo circuit 78. That is, the condition E3="0" designates the counterclockwise rotation of motor 80. In this case, PU 70 is shifted from the outer side of disc 10 to the inner side thereof with a given high speed of 6 mm/sec., for example.

When stop key K1 is depressed, FF's $74_1$ to $74_3$ are reset and outputs E1 to E3 are all logical "0". In this case, when clamp-off key K6 is depressed, FF 90 is reset so that transistors Q1 and Q3 are OFF while transistors Q2 and Q4 are ON. Then, another DC current Ir flows from terminal T1 to terminal T2, and winding 28 generates an electromagnetic attracting force so that the clamper 30 releases the clamping of disk 10 (FIG. 1A).

Keys K5 and K6 are used for manual manipulation of the clamping. When any one of outputs E1 to E3 is logical "0", since FF 90 is set, keys K5 and K6 are inactive. Where all outputs E1 to E3 are logical "1", i.e., the mode of the player is "stop", then keys K5 and K6 are active. That is, where the motors 14 and 80 are stopped, the depression of key K5 sets FF 90 (clamp-on), and the depression of key K6 resets FF 90 (clamp-off).

Figure 9:
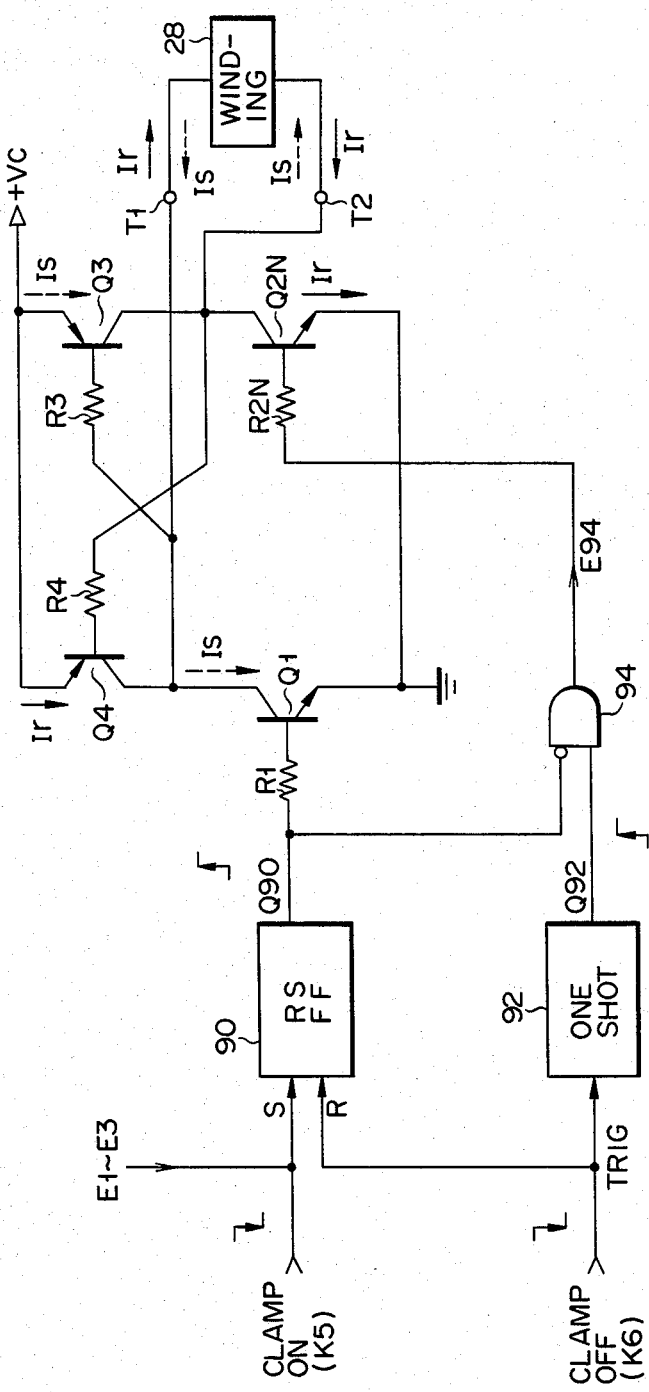
FIG. 9 shows an electric circuitry for controlling the clamping operation of the clamper (30) shown in FIGS. 3A and 3B.

FIG. 9 shows an electric circuit for controlling the operation of clamper 30 of FIGS. 3A and 3B.

When key k5 is depressed or any one of outputs E1 to E3 is logical "0", RS-FF 90 is set and its output Q90 becomes to logical "1". Then, transistors Q1 and Q3 are ON while transistors Q2N and Q4 are OFF. In this case, a DC current Is flows into winding 28 so that the clamper 30 clamps the disc 10 (FIG. 3B).

When key K6 is depressed, FF 90 is reset and a one shot multivibrator 92 is triggered. In this case output Q90 of FF 90 becomes to logical "0" and an output Q92 of one shot 92 becomes to logical "1". Output Q90 having logical "0" is applied to the inverted input of an AND gate 94 whose noninverted input receives output Q92 having logical "1". Thus, gate 94 outputs a signal E94 having logical "1". The logical "1" of signal E94 is applied to the base of an NPN transistor Q2N. Then, transistors Q2N and Q4 are ON, and a DC current Ir flows into winding 28 so that the clamper 30 is lifted over the turntable 12 (FIG. 3A). After completion of such lifting (i.e., clamp-off), clamper 30 is held at reel 26 by the magnetic attracting force Fa effected between magnets 32 and 34. Thus, current Ir is no more necessary, and current Ir is cut off after the clamp-off. Namely, outut Q92 of one shot 92 temporarily retains logical "1" after triggering of key K6 and, after a certain period of time being determined by the time constant of one shot 92, the logical level of output Q92 is changed from "1" to "0". Then, all transistors Q1, Q2N, Q3 and Q4 are turned-off so that the currents Is and Ir are zero.

Although specific embodiments have been illustrated and described herein, it is not intended that the invention be limited to the element and configuration disclosed. One skilled in the art will recognize that the particular element or subconstruction may be used without departing from the scope of the invention.

What is claimed is:

1. A clamper for a disk player apparatus comprising:
turntable means for receiving a disc to be played back;
clamp means for engaging and holding the disc against said turntable means and between said turntable means and said clamp means when said clamp means is in a first position and for permitting the removal of the disc from the turntable means when said clamp means is in a second position;
support means positioned opposite said turntable means for rotatably and slidably supporting said clamp means, said clamp means being slidable along a direction running from said support means to said turntable means and, when said clamp means is in said first position, said clamp means being mechanically free from said support means;
electromagnetic force means fixed solely to said clamp means and said support means for selectively clamping said clamp means against and releasing said clamp means from said turntable means;
means for selectively supplying a first current to said electromagnetic means, said first current causing said electromagnetic means to generate an electromagnetic force which urges the clamp means toward said turntable means so that the clamp means engages and clamps the disc against said turntable means; and
means for selectively supplying a second and opposite current to said electromagnetic means, said second current causing said electromagnetic means to generate an electromagnetic force which urges the clamp means away from said turntable means so that the clamp means is spaced from said turntable means.

2. The clamper of claim 1, wherein said electromagnetic force means includes:
magnet means mounted on a given position of said clamp means; and
electromagnet means mounted on a given position of said support means for generating a magnetic field in which said magnet means is disposed, said magnetic field applying said electromagnetic repelling force to said magnet means.

3. The clamper of claim 2, wherein said magnet means includes a magnet which is permitted to rotate coaxially on an axis of rotation of said turntable means.

4. The clamper of claim 3, wherein said electromagnet means includes a winding of an electric wire, said winding and said magnet being coaxially arranged.

5. The clamper of claim 4, wherein said magnet has a ring like figure whose rotational axis is substantially identical with that of said turntable means.

6. The clamper of claim 5, wherein said winding has a ring like figure whose geometrical center is substantially identical with the rotational axis of said ring like magnet.

7. The clamper of claim 1, wherein said electromagnetic force means includes:
a ring like magnet mounted on a given portion of said clamp means, said ring like magnet being permitted to rotate coaxially on an axis of said ring like magnet being substantially identical with that of said turntable means;
one or more windings of an electric wire being arranged around said ring like magnet and being mounted on a given portion of said support means, for generating a rotational magnetic field in which said ring like magnet is placed, said rotational magnetic field applying a rotational force to rotate the clamp means, disc and turntable means when the clamp means is in the first position, as well as applying said electromagnetic repelling force to said ring like magnet.

8. The clamper of any one of claims 1, 2, 3, 4, 5 or 6, wherein said turntable means includes a spindle having a given diameter for centering a center hole of said disc so that said disc coaxially rotates with the rotation of said turntable means, said spindle penetrating the center hole of said disc when playback operation of said disc is carried out; and
said clamp means includes a portion defining a hollow having a given size for holding said spindle to said portion of hollow in order to align the rotational axis of said turntable means with that of said clamp means.

9. The clamper of claim 7, wherein said turntable means includes a spindle having a given diameter for centering a center hole of said disc so that said disc coaxially rotates with the rotation of said turntable means, said spindle penetrating the center hole of said disc when playback operation of said disc is carried out; and
said clamp means includes a portion defining a hollow having a given size for holding said spindle in said portion of hollow in order to align the rotational axis of said turntable means with that of said clamp means.

10. The clamper of any one of claims 1, 2, 3, 4, 5 or 6, wherein said clamp means includes a portion defining a hole having a predetermined diameter at its rotational center position; and said support means includes a guide rod which comprises a first portion having a first size and a second portion having a second size, said first portion being so penetrating the hole of said clamp means that said first portion fits said hole in a playback standy state, and said second portion being so penetrating said hole that said second portion is mechanically separated from said hole in a playback operation state of the disc player apparatus.

11. The clamper of any one of claims 2, 3, 4, 5 or 6, wherein said turntable means includes means arranged on a turntable plane of said turntable means to which said disc is placed, for increasing a frictional force effected between said curntable plane and said disc.

12. The clamper of claim 7, wherein said turntable means includes means arranged on a turntable plane of said turntable means to which said disc is placed, for increasing a frictional force effected between said turntable plane and said disc.

13. The clamper of claim 8, wherein said turntable means includes means arranged on a turntable plane of said turntable means to which said disc is placed, for increasing a frictional force effected between said turntable plane and said disc.

14. The clamper of claim 10, wherein said turntable means includes means arranged on a turntable plane of said turntable means to which said disc is placed, for increasing a frictional force effected between said turntable plane and said disc.

15. The clamper of claim 8, wherein said support means includes a pocket portion to which said disc is inserted, for provisionally positioning said disc inserted therein such that the center hole of said disc is substantially faced to the hollow of said clamp means.

16. The clamper of claim 9, wherein said support means includes a pocket portion to which said disc is inserted, for provisionally positioning said disc inserted therein such that the center hole of said disc 17. The clamper of claim 13, wherein said support means includes a pocket portion to which said disc is inserted, for provisionally positioning said disc inserted therein such that the center hole of said disc is substantially faced to the hollow of said clamp means.

18. The clamper of claim I wherein said clamp means includes a hole formed at its rotational center; and
said support menas includes a guide rod projecting through said hole, the portion of the fuide rod within the hole when the clamp means is in the first position being smaller in diameter than the hole and.out of contact with the clamp means, and the portions of the guide rod within the hole when the clamp means is in the second position being only slightly smaller in diameter than the hole.

19. A clamper for a disk player apparatus comprising:
turntable means for receiving a disc to be played back;
clamp means for engaging and holding the disc against said turntable means and between said turntable means and said clamp means when said clamp means is in a first position and for permitting the removal of the disc from the turntable means when said clamp means is in a second position;
support means positioned opposite said turntable means for rotatably and slidably supporting said clamp means, said clamp means being slidable along a direction running from said support means to said turntable means and, when said clamp means is in said first position, said clamp means being mechanically free from said support means;
permanent magnet means which produces a permanent magnetic force that biases said clamp means toward said second position;
electromagnetic force means fixed solely to one of said clamp means and said support means for selectively clamping said clamp means against said turntable means; and
means for supplying a current to said electromagnetic means, said current selectively causing the combination of said permanent magnetic means, and said electromagnetic means to generate an electromagentic repelling force which overcomes the force of the permanent magnet means and urges the clamp means toward said turntable means so that the clamp means engages and clamps the disc against said turntable means.

20. The clamper of claim 19 wherein said electromagnetic force means includes a magnet means mounted on said clamp means and an electromagnetic means mounted on said support means for generating an electromagnetic field in which said magnetic means is disposed.

21. The clamper of claim 20 further comprising a permanent magnet fixed to said support means, said permanent magnet and said support means combining to create a force which biases the clamping means toward the second position.

22. The clamping means of claim 20 further comprising means for sequentially exciting said electromagnetic means to create a rotational magnetic field to rotate the magnet means, clamp means, disc and turntable means when the clamp means is in the first position.

23. A clamper for a disk player apparatus comprising:
turntable means for receiving a disc to be played back;
clamp means for engaging and holding the disc against said turntable means and between said turntable means and said clamp means when said clamp means is in a first position and for permitting the removal of the disc from the turntable means when said clamp means is in a second position;
support means positioned opposite said turntable means for rotatably and slidably supporting said clamp means, said clamp means being slidable along a direction running from said support means to said turntable means and, when said clamp is in said first position, said clamp means being mechanically free from said support means;
a first permanent magnet means mounted on one of said clamp means and support means;
a second permanent magnet means mounted on the other of said clamp means and said support means for combining with said first permanent magnet means to create a permanent magnetic force which biases said clamp means toward said second position;
electromagnetic means mounted solely on one of said clamp means and support means for selectively clamping said clamp means against said turntable means; and
means for selectively supplying a current to said electromagnetic means, said current causing said electromagnetic means to generate an electromagnetic field that combines with said permanent magnet means to generate an electromagnetic force which overcomes the permanent magnetic biasing force and urges the clamp means toward said turntable means so that the clamp means engages and clamps the disc against the turntable means.

24. The clamper of claim 23 wherein said magnetic means includes a permanent magnet fixed to said support means.

25. The clamper of 24 further comprising means for sequentially exciting said electromagnetic means to create a rotational magnetic field which rotates the magnet means, clamp means, disc and turntable means when the clamp is in the first position.

26. The clamper of claim 23, wherein said turntable means includes a spindle having a given diameter for centering a center hole of said disc so that said disc coaxially rotates with the rotation of said turntable means, said spindle penetrating the center hole of said disc when playback operation of said disc is carried out; and said clamp means includes a portion defining a hollow having a given size for holding said spindle in said portion of hollow in order to align the rotational axis of said turntable means with that of said clamp means.

27. The clamper of claim 23, wherein said turntable means includes means arranged on a turntable plane of said turntable means to which said disc is placed, for increasing a frictional force effected between said turntable plane and said disc.

28. The clamper of claim 26, wherein said support means includes a pocket portion to which said disc is inserted, for provisionally positioning said disc inserted therein such that the center hole of said disc is substantially faced to the hollow of said clamp means.

29. The clamper of claim 23 wherein said clamp means includes a hole formed at its rotational center; and said support means includes a guide rod projecting through said hole, the portion of the guide rod within the hole when the clamp means is in the first position being smaller in diameter than the hole and out of contact with the clamp means, and the portion of the guide rod within the hole when the clamp means is in the second position being only slightly smaller in diameter than the hole.

30. The clamper of claim 24 wherein said clamp means includes a hole formed at its rotational center; and said support means includes a guide rod projecting through said hole, the portion of the guide rod within the hole when the clamp means is in the first position being smaller in diameter than the hole and out of contact with the clamp means, and the portion of the guide rod within the hole when the clamp means is in the second position being only slightly smaller in diameter than the hole.

31. A clamper for a disc player apparatus comprising:

turntable means for receiving a disc to be played back;

clamp means for engaging and holding the disc against said turntable means and between said turntable means and said clamp means when said clamp means is in a first position and for permitting the removal of the disc from the turntable means when said clamp means is in a second position;

support means positioned opposite said turntable means for rotatably and slidably supporting said clamp means, said clamp means being slidable along a direction running from said support means to said turntable means and, when said clamp means is in said first position, said clamp means being mechanically free from said support means;

permanent magnet means mounted on one of said clamp means and support means;

an electromagnetic coil mounted on the other of said clamp means and support means;

means for applying an electric current to said electromagnetic coil in one direction to generate an electromagnetic field which in combination with the permanent magnet means produces a force which urges the clamp means to the second position; and means for applying electric current to said electromagnetic coil in the opposite direction to generate an electromagnetic field which in combination with the permanent magnet means produces a force which urges the clamp means to the first position.

* * * * *

UNITED STATES PATENT AND TRADEMARK OFFICE
CERTIFICATE OF CORRECTION

PATENT NO. : 4,509,157
DATED : April 2, 1985
INVENTOR(S) : KAORU MORINAGA

It is certified that error appears in the above-identified patent and that said Letters Patent is hereby corrected as shown below:

Claim 7, col. 10, line 28, after "axis" insert --of rotation of said turntable means, and the rotational axis--

Claim 16, col. 11, line 39 after "disc" insert --is substantially faced to the hollow of said clamp means.--

Signed and Sealed this

Sixteenth Day of July 1985

[SEAL]

Attest:

DONALD J. QUIGG

Attesting Officer    Acting Commissioner of Patents and Trademarks